Patented Feb. 16, 1932                                                         1,845,426

UNITED STATES PATENT OFFICE

MATTHIAS LATTEN, OF LEVERKUSEN-ON-THE-RHINE, GERMANY ASSIGNOR TO GENERAL ANILINE WORKS, INC., OF NEW YORK, N. Y., A CORPORATION OF DELAWARE

AZO DYESTUFFS

No Drawing.   Application filed July 21, 1930, Serial No. 469,644, and in Germany August 8, 1929.

The present invention relates to new azo dyestuffs. More particularly it relates to dyestuffs which may be represented by the general formula:

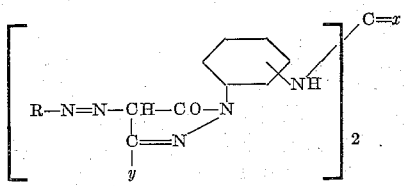

wherein $x$ stands for oxygen or sulfur, $y$ stands for methyl, the carboxylic acid group or an esterified carboxylic acid group, and R stands for an aromatic nucleus, such as a benzene or naphthalene nucleus, containing a mordanting group, that is a hydroxy or carboxylic acid group in ortho position to the azo bridge or an ortho-hydroxy-carboxy grouping, at least one of the nuclei being substituted by an acid group, for example, by a sulfonic or carboxylic acid group, and wherein all nuclei may be substituted by any substituents, such as alkyl, oxalkyl, halogen, the nitro group.

My new dyestuffs are obtainable by coupling in the usual manner a diazotized aromatic amine being substituted in ortho position to the amino group by a carboxylic acid or hydroxy group or by a salicylic acid grouping with a 1-phenyl pyrazolone containing an amino group in the phenyl nucleus and converting the amino azo dyestuff thus obtained into the corresponding urea or thiourea derivative by treatment with phosgene or thiophosgene. Instead of phosgenating or thiophosgenating directly the amino azo dyestuff, the same may be previously condensed with a nitrobenzoylchloride followed by reduction, and the azo dyestuffs thus obtainable containing instead of the group —NH— the group

—NH.CO.C₆H₅.NH—

are to be included within my invention. Further in case the diazotization component is substituted by a nitro group, the same may be reduced to form the amino group and the urea compound containing amino groups may be again subjected to the action of phosgene or thiophosgene; also the products thus obtainable fall within my invention.

The dyestuffs thus obtained are in the form of their alkali metal salts dark powders, dyeing cotton yellowish brown to red shades which are rendered fast to washing and light by a subsequent treatment of the dyed fiber with suitable salts of heavy metals, such as salts of copper or chromium.

The invention is illustrated by the following examples without limiting it thereto, the parts are by weight.

*Example 1.*—153 parts of o-aminosalicylic acid are diazotized in the customary manner. The diazo compound is treated with sodium acetate or rendered weakly alkaline and coupled with 189 parts of 1-(p-aminophenyl)-3-methyl-5-pyrazolone; stirring is continued until the formation of dyestuff is complete, which is then isolated either by rendering acid to Congo without the addition of salt or rendering alkaline with the addition of common salt. The resulting dyestuff is dissolved in hot water, if necessary with the addition of caustic soda, filtered, an excess of alkali is added and then phosgene is introduced until the formation of the urea compound is complete. The new product is isolated by salting out; it is filtered and dried. The dyestuff having in its free state the following formula:

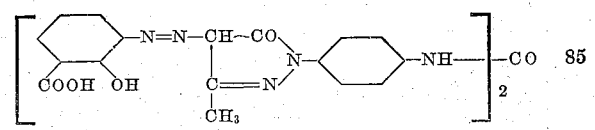

dyes cotton yellow shades, which by a subsequent treatment with copper sulfate in acetic acid solution are rendered fast to washing and very fast to light.

*Example 2.*—153 parts of p-aminosalicylic acid are diazotized in the customary manner and coupled with 189 parts of 1-(p-aminophenyl)-3-methyl-5-pyrazolone either after rendering the diazo solution weakly acid by means of sodium acetate or alkaline by means of sodium carbonate. When the formation of the dyestuff is complete the latter is isolated by rendering acid to Congo and with the addition of salt. The thoroughly washed dyestuff is dissolved in hot aqueous alkali, filtered and after the addition of an excess of sodium carbonate subjected to the action of phosgene. The new product having in its free state the following formula:

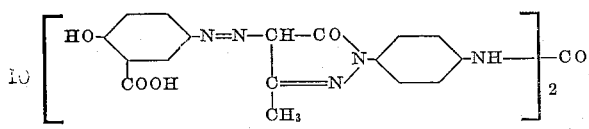

is isolated and dried. It dyes cotton a yellowish orange shade, which is, however, not fast to washing. By subsequent treatment with copper sulfate the shade becomes yellower and the dyeing fast to washing.

Instead of pure o-aminosalicylic acid or pure p-amino salicylic acid, a mixture of both acids can be diazotized and coupled with aminopyrazolones, and the dyestuff can be transformed into its urea compound in the same manner as described in Examples 1 and 2.

Furthermore, instead of p-aminophenyl-3-methyl-5-pyrazolone, the corresponding m-compound or m- or p-amino-1-phenyl-5-pyrazolone-3-carboxylic acid or esters thereof can be employed. The resulting dyestuff exhibits similar properties as those described in Examples 1 and 2.

*Example 3.*—272 parts of p-aminobenzoyl-o-aminosalicylic acid are diazotized in the customary manner, then coupled with 1-(m-aminophenyl)-3-methyl-5-pyrazolone (dissolved while acid to Congo), the reaction mixture being at first rendered acetic acidic by means of sodium acetate and finally alkaline by means of sodium carbonate; when the formation of the dyestuff is complete, the same is isolated by rendering acid to Congo. The thoroughly washed dyestuff is dissolved while hot, if necessary with the addition of caustic soda lye and filtered. After the addition of excess of alkali, the product is treated with phosgene, and the new dyestuff having in its free state the following formula:

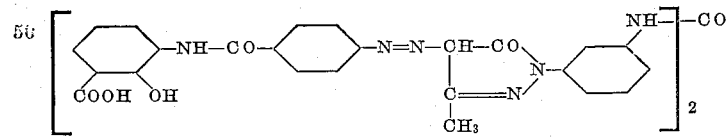

is separated in an alkaline sodium carbonate solution by the addition of salt or by rendering acid to Congo without the addition of salt. The urea thus obtained dyes cotton an orange shade. The dyeings are, however, not fast to washing and are rendered fast to washing by a subsequent treatment with copper sulfate.

*Example 4.*—330 parts of the urea from p-phenylenediamine carboxylic acid are dissolved in a solution rendered alkaline with caustic soda, cooled, mixed with the requisite quantity of sodium nitrite and entered into hydrochloric acid and ice. When the reaction to nitrite has ceased, p-aminophenyl-methylpyrazolone, dissolved to be just acid to Congo, is added, the solution is rendered acetic acidic by means of sodium acetate and after 2 hours alkaline by means of sodium carbonate. When the coupling is complete, the product is isolated at 50° C. by rendering acid to Congo without the addition of salt. The resulting dyestuff is dissolved while hot in the presence of caustic soda, filtered, an excess of sodium carbonate is added and the aminoazo body is converted into the urea derivative by means of phosgene; the isolation of the dyestuff is effected by rendering acid to Congo, after which it is dried and then ground up with a little powdered caustic alkali in order to impart the desired solubility.

*Example 5.*—154 parts of 5-nitro-1:2-aminophenol, diazotized in the customary manner are coupled in an appropriate medium with 189 parts of 1-(p-aminophenyl)-3-methyl-5-pyrazolone, the coupling is completed by rendering the solution alkaline by means of caustic soda, after which the dyestuff is isolated by rendering acid to litmus. The dyestuff is then dissolved while hot with the addition of caustic soda lye and filtered, an excess of sodium carbonate is added and phosgene is introduced until acid to Congo, whereby precipitation occurs. The product having in its free state the following formula:

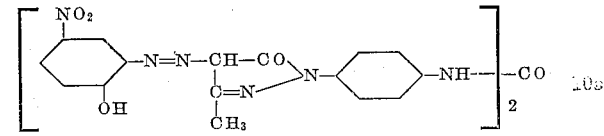

is isolated by rendering the solution alkaline with caustic soda and salting out by the addition of salt; the dyestuff is dried and ground with a little caustic soda in order to impart the desired solubility. It dyes cotton brownish red shades.

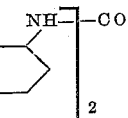

*Example 6.*—284 parts of diazotized and then nitrated 1:2-aminonaphthol-4-sulfonic acid are introduced in powder form at 0° C. into a solution of 189 parts of 1-(p-aminophenyl)-3-methyl-5-pyrazolone, obtainable with a small excess of caustic soda and in an appropriate solvent (water or pyridine). The coupling is completed, and the dyestuff isolated by rendering acid to Congo; it is thoroughly washed and dissolved while hot with the addition of alkali. After filtering, an excess of sodium carbonate is added and then phosgene is introduced until the reaction is acid to Congo. The resulting dyestuff is isolated by rendering weakly alkaline by means of sodium carbonate and salting out by the addition of salt. The product having in its free state probably the following formula:

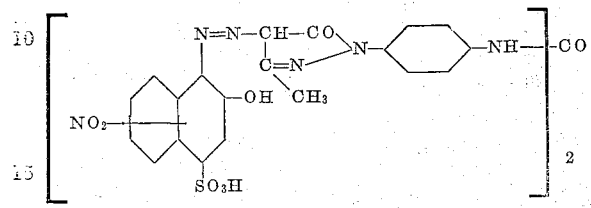

dyes cotton brick red shades, which are sensitive to acetic acid. By a subsequent coppering the shade brightens and the dyeing becomes fast to acetic acid and washing.

*Example 7.*—239 parts of diazotized 1:2-aminonaphthol-4-sulfonic acid are introduced in powder form at 0° C. into a solution of 189 parts of 1-(p-aminophenyl)-3-methyl-5-pyrazolone in water, rendered alkaline with caustic soda, (if necessary with the addition of pyridine) and stirred until the formation of the dyestuff is complete; the dyestuff is isolated in the cold by rendering acid to Congo, it is well washed, dissolved while hot, if necessary with the addition of caustic soda, filtered, an excess of sodium carbonate or other alkali is added, which neutralizes the hydrochloric acid and then phosgene is introduced until the reaction becomes acid to Congo, whereby a precipitation occurs. The product having in its free state probably the formula:

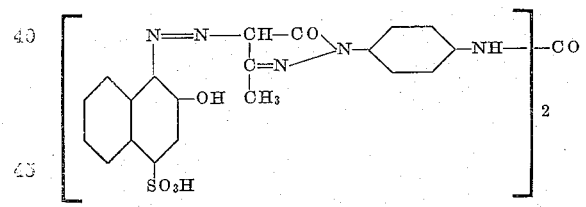

is isolated by rendering just alkaline by means of sodium carbonate and with the addition of salt and then dried. It dyes cotton brownish red shades.

*Example 8.*—239 parts of 2:3-aminonaphthol-6-sulfonic acid are diazotized in the customary manner, a solution of 1-(p-aminophenyl)-3-methyl-5-pyrazolone (acid to Congo) is added, after which the solution is slowly rendered acetic acidic by means of sodium acetate, and the coupling is completed by rendering alkaline by means of sodium carbonate. The dyestuff is isolated by rendering acid to Congo, it is then dissolved while hot, if necessary with the addition of caustic soda lye, filtered, sodium carbonate is added and then phosgene is introduced until the reaction becomes acid to Congo. The dyestuff is isolated by rendering alkaline with sodium carbonate and adding salt. The resulting dyestuff having in its free state probably the following formula:

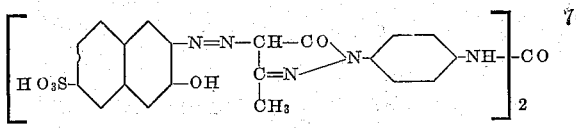

is dried.

All the above described products can obviously also be produced by coupling the said diazo compounds first with the nitrophenyl-methylpyrazolones, then reducing the nitro group by means of sodium sulfide and finally subjecting the amino bodies to the action of phosgene.

I claim:

1. As new products azo dyestuffs having in the free state the probable general formula:

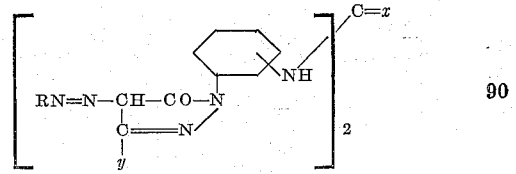

wherein $x$ stands for oxygen or sulfur, $y$ stands for methyl, the carboxylic acid group or the esterified carboxylic acid group, R stands for an aromatic nucleus of the benzene or naphthalene series containing a mordanting group, at least one of the nuclei being substituted by an acid group, and wherein all nuclei may be further substituted by substituents of the group consisting of alkyl, oxalkyl, halogen and the nitro group, dyeing cotton yellowish brown to red shades which are rendered fast to washing and light by a subsequent treatment with a heavy metal salt.

2. As new products azo dyestuffs having in the free state the probable general formula:

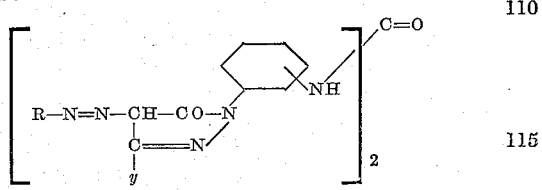

wherein $y$ stands for methyl, the carboxylic acid group or the esterified carboxylic acid group, R stands for an aromatic nucleus of the benzene or naphthalene series containing a mordanting group, at least one of the nuclei being substituted by an acid group, and wherein all nuclei may be further substituted by substituents of the group consisting of alkyl, oxalkyl, halogen and the nitro group, dyeing cotton yellowish brown to red shades which are rendered fast to washing and light by a subsequent treatment with a heavy metal salt.

3. As new products azo dyestuffs having in the free state the probable general formula:

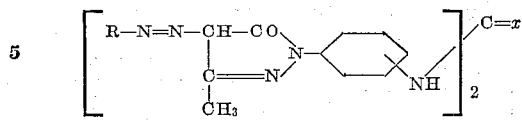

wherein $x$ stands for oxygen or sulfur, R stands for an aromatic nucleus of the benzene or naphthalene series containing a mordanting group, at least one of the nuclei being substituted by an acid group, and wherein all nuclei may be further substituted by substituents of the group consisting of alkyl, oxalkyl, halogen and the nitro group, dyeing cotton yellowish brown to red shades which are rendered fast to washing and light by a subsequent treatment with a heavy metal salt.

4. As new products azo dyestuffs having in the free state the probable general formula:

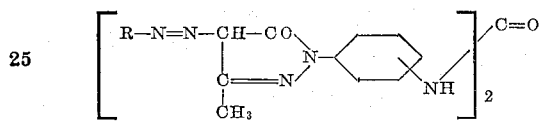

wherein R stands for an aromatic nucleus of the benzene or naphthalene series containing a mordanting group, at least one of the nuclei being substituted by an acid group, and wherein all nuclei may be further substituted by substituents of the group consisting of alkyl, oxalkyl, halogen and the nitro group, dyeing cotton yellowish brown to red shades which are rendered fast to washing and light by a subsequent treatment with a heavy metal salt.

5. As new products azo dyestuffs having in the free state the probable general formula:

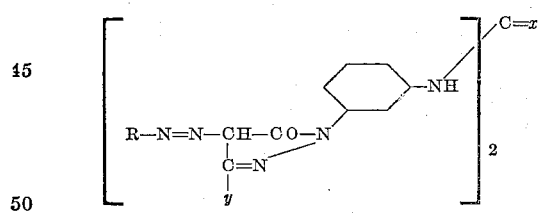

wherein $x$ stands for oxygen or sulfur, $y$ stands for methyl, the carboxylic acid group or the esterified carboxylic acid group, R stands for an aromatic nucleus of the benzene or naphthalene series containing a mordanting group, at least one of the nuclei being substituted by an acid group, and wherein all nuclei may be further substituted by substituents of the group consisting of alkyl, oxalkyl, halogen and the nitro group, dyeing cotton yellowing brown to red shades which are rendered fast to washing and light by subsequent treatment with a heavy metal salt.

6. As new products azo dyestuffs having in the free state the probable general formula:

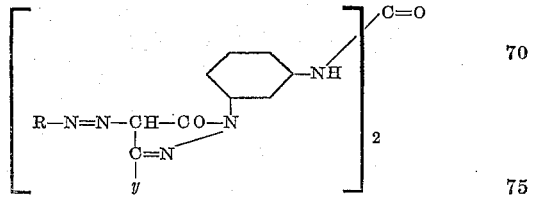

wherein $y$ stands for methyl, the carboxylic acid group or the esterified carboxylic acid group, R stands for an aromatic nucleus of the benzene or naphthalene series containing a mordanting group, at least one of the nuclei being substituted by an acid group, and wherein all nuclei may be further substituted by substituents of the group consisting of alkyl, oxalkyl, halogen and the nitro group, dyeing cotton yellowish brown to red shades which are rendered fast to washing and light by a subsequent treatment with a heavy metal salt.

7. As new products azo dyestuffs having in the free state the probable general formula:

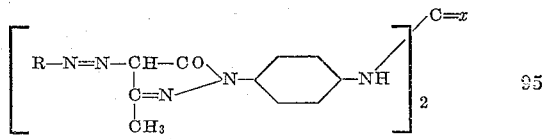

wherein $x$ stands for oxygen or sulfur, R stands for an aromatic nucleus of the benzene or naphthalene series containing the mordanting group, at least one of the nuclei being substituted by an acid group, and wherein all nuclei may be further substituted by substituents of the group consisting of alkyl, oxalkyl, halogen and the nitro group, dyeing cotton yellowish brown to red shades which are rendered fast to washing and light by a subsequent treatment with a heavy metal salt.

8. As new products azo dyestuffs having in the free state the probable general formula:

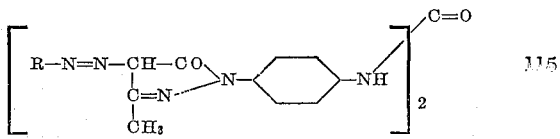

wherein R stands for an aromatic nucleus of the benzene or naphthalene series containing a mordanting group, at least one of the nuclei being substituted by an acid group, and wherein all nuclei may be further substituted by substituents of the group consisting of alkyl, oxalkyl, halogen and the nitro group, dyeing cotton yellowish brown to red shades which are rendered fast to washing and light by a subsequent treatment with a heavy metal salt.

9. As new products azo dyestuffs having in the free state the probable general formula:

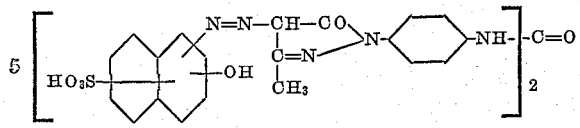

wherein the hydroxy group stands in ortho position to the amino group and wherein all nuclei may be further substituted by substituents of the group consisting of alkyl, oxalkyl, halogen and the nitro group.

10. As a new product the azo dyestuff having in its free state the probable formula:

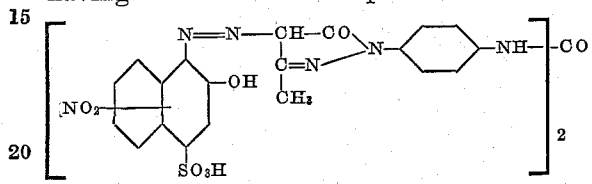

dyeing cotton brick red shades sensitive to acetic acid, which by subsequent coppering brightens and becomes fast to acetic acid and washing.

In testimony whereof, I affix my signature.

MATTHIAS LATTEN.